US009563613B1

(12) United States Patent
Dinkel et al.

(10) Patent No.: US 9,563,613 B1
(45) Date of Patent: Feb. 7, 2017

(54) SYSTEM AND METHOD FOR DYNAMIC PORTABLE DOCUMENT FILE GENERATION

(71) Applicant: Sprint Communications Company L.P., Overland Park, KS (US)

(72) Inventors: James Dinkel, Lenexa, KS (US); Veeranjaneya V. Poranki, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 195 days.

(21) Appl. No.: 14/604,662

(22) Filed: Jan. 23, 2015

(51) Int. Cl.
*G06F 17/00* (2006.01)
*G06F 17/22* (2006.01)
*G06F 17/27* (2006.01)
*G06F 17/24* (2006.01)

(52) U.S. Cl.
CPC ......... *G06F 17/227* (2013.01); *G06F 17/2247* (2013.01); *G06F 17/248* (2013.01); *G06F 17/2705* (2013.01)

(58) Field of Classification Search
CPC .......................... G06F 17/2247; G06F 17/248
See application file for complete search history.

(56) References Cited

U.S. PATENT DOCUMENTS

| 5,968,119 | A   | * | 10/1999 | Stedman | G06F 17/30893 707/E17.107 |
| 6,115,737 | A   | * | 9/2000  | Ely     | H04L 29/06 709/203 |
| 2004/0073708 | A1 | * | 4/2004  | Warnock | G06F 17/2247 709/246 |
| 2007/0089053 | A1 | * | 4/2007  | Uhlig   | G06F 17/212 715/255 |
| 2007/0130505 | A1 | * | 6/2007  | Woods   | G06F 17/243 715/224 |
| 2009/0282150 | A1 | * | 11/2009 | Iwasaki | G06F 9/5038 709/226 |
| 2010/0251092 | A1 | * | 9/2010  | Sun     | G06F 17/243 715/222 |

* cited by examiner

*Primary Examiner* — Mohammed-Ibrahim Zuberi

(57) ABSTRACT

A method for providing digital communication using dynamic portable document format (PDF) generation is disclosed. The method comprises a dynamic generation server receiving a request message that includes a plurality of fields, a request type identifier, and a source identifier associated with a requesting source application. The method also comprises parsing the request message, and responsive to the parsing, determining a plurality of output requirement parameters. The dynamic generation server correlates the request message with source content based on the determination of output requirement parameters. The method includes selecting at least one HTML template, CSS string, and graphics file based on the correlation, while further scraping input values from the request message. Additionally, the method includes dynamically building a customized HTML string, and converting the customized HTML string into a PDF document. The method further comprises returning a reply message that includes the PDF document to a reply message destination.

17 Claims, 7 Drawing Sheets

SYSTEM AND METHOD FOR DYNAMIC PORTABLE DOCUMENT FILE GENERATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A business service provider may operate a mobile virtual network operator business unit to complement their retail model services. Mobile virtual network operators (MVNO) are organizations that provide mobile communication services but may not have their own licensed frequency allocation of radio spectrum or the physical infrastructure required to provide wireless communication services. Mobile virtual network operators may contract to distribute wireless services provided by telecommunications service providers that have licensed frequency and physical infrastructure. Mobile virtual network operators function as distributors of wireless services and may set their own pricing structures, which thus may require separate contractual or regulatory documentation prior to providing or changing communication service for a customer. The proliferation of mobile virtual network operators has been facilitated by regulatory intervention designed to lower the barriers for market entry and ultimately increase competition. Some telecommunications service providers have made strategic decisions to extend their existing operations by distributing their services to target niche or under-served market segments through a second or perhaps multiple brands that are unique to the type of subscription and/or service experienced by the customer.

An enterprise or business service provider (e.g., a telecommunication service provider) may provide a variety of communication services to numerous customers who operate owned or leased telecommunications equipment via the communication services. The business service provider may allocate communications services and resources to customers based on the type of subscription or agreement and corresponding communication parameters. Communication services may be defined, at least in part, by a customer subscription and/or service level agreement (SLA) that may define a class of service, a bandwidth, and other key communication parameters of operation on a particular communication network. When a customer desires to change their subscription or service (or a new customer is being added), submission of a new SLA and other contractual documentation may be desirable prior to modifying the communications service network that allows for operation of the communication service with the customer according to the change. For legal and/or regulatory reasons, the business service provider may need to ensure that certain content is provided in documentation. Document submission to the business service provider may occur via a physical medium (e.g., mailing a paper document form) and/or via electronic communication of a Portable Document Format (PDF) file. A Portable Document Format is a file format used, at least in part, to capture data structure format and/or content of a document.

SUMMARY

In an embodiment, a method is disclosed. The method comprises receiving from a client system, by a dynamic generation server executing at least one processor, a request message that includes a plurality of fields, a request type identifier, and a source identifier associated with a requesting source application. The plurality of fields comprise input values and at least one of the plurality of fields include a user identification value that is associated with user input to the client system. The method further includes parsing, by the dynamic generation server, the request message that identifies the source identifier and the input values that correspond to the plurality of fields. Responsive to the parsing, the method includes determining a plurality of output requirement parameters based on the input values of the plurality of fields, the user identification value, the request type identifier, the source identifier, and a reply message destination. Based on the determination of output requirement parameters, the method further comprises correlating, by the dynamic generation server, the request message with source content that includes at least one HTML template, a Cascading Style Sheets (CSS) string, and a graphics file. The method comprises selecting, by the dynamic generation server from a content management server, at least one HTML template, CSS string, and graphics file based on the correlation. The method then scrapes, by the dynamic generation server, input values from the plurality of fields of the request message based on the selection. The method includes dynamically building, by the dynamic generation server, a customized HTML string using the scraped input values based on the selecting. Responsive to the dynamic building, the method further includes converting, by the dynamic generation server, the customized HTML string into a PDF document that conforms to at least one of the plurality of output requirement parameters. Additionally, the method then returns, by the dynamic generation server, a reply message that includes the PDF document to the reply message destination based on the user identification value and source identifier.

In an embodiment, a system is disclosed. The system includes a content management server and a dynamic generation server. The content management server comprises at least one processor communicatively coupled with a non-transitory memory. The non-transitory memory stores source content, the source content comprising a plurality of Hypertext Markup Language (HTML) templates, a plurality of Cascading Style Sheets (CSS) strings, a plurality of graphics files. The content management server further comprises a content management application that, upon execution configures the at least one processor to identify source content based on a corresponding content identifier of the particular source content. The corresponding content identifier is provided to a dynamic generation server responsive to a request associated with source content. The content management application further configures a processor to update the source content and corresponding content identifier responsive to a change in the particular source content referenced by the content management server. The content management application also provides source content responsive to a selection by a dynamic generation server.

The dynamic generation server comprises at least one processor communicatively coupled with a non-transitory memory, and a dynamic generation application that, upon execution configures the at least one processor to receive, from a client system, a request message. The request message includes a plurality of fields, a request type identifier, and a source identifier associated with a requesting source application. The plurality of fields comprise input values and at least one of the plurality of fields includes a user identification value that is associated with user input to the client system. The dynamic generation server further parses the request message that identifies the source identifier and the input values that correspond to the plurality of fields, and responsive to the request message being parsed, determines a plurality of output requirement parameters. The determination is based on the input values of the plurality of fields, the user identification value, the request type identifier, the source identifier, and a reply message destination. Based on the determination of output requirement parameters, the dynamic generation server correlates, by an identification of source content from the content management server, the request message with source content. The correlation references at least one HTML template, a Cascading Style Sheets (CSS) string, and a graphics file. Based on the correlation, the dynamic generation server further selects, from a content management server, at least one HTML template, CSS string, and graphics file, and then scrapes input values from the plurality of fields of the request message based on the selection. The dynamic generation server further dynamically builds a customized HTML string using the scraped input values based on the selection, and responsive to the dynamic build, converts the customized HTML string into a PDF document that conforms to at least one of the plurality of output requirement parameters. The dynamic generation server then returns a reply message that includes the PDF document to the reply message destination based on the user identification value and source identifier.

In an embodiment, a method is disclosed. The method comprises receiving, by a content management server executing at least one processor, a change in source content stored in a communicatively coupled non-transitory memory. The source content comprises a plurality of HTML templates, Cascading Style Sheets (CSS) strings, and a graphics files. The change in source content corresponds to an updated HTML template that is a modification to one of the plurality of HTML templates. The modification is based on user input parameters received via the content management server and without accessing a dynamic generation server. Based on receiving the change in source content, the method further includes modifying, by the content management server, a dynamic place holder of the updated HTML template using the user input parameters. The method then receives from a client system, by a dynamic generation server executing at least one processor, a request message that includes a plurality of fields, a request type identifier, and a source identifier associated with a requesting source application. The plurality of fields comprise input values and at least one of the plurality of fields includes a user identification value that is associated with user input to the client system. The method further includes parsing, by the dynamic generation server, the request message that identifies the source identifier and the input values that correspond to the plurality of fields. Responsive to the parsing, the method continues by determining a plurality of output requirement parameters based on the input values of the plurality of fields, the user identification value, the request type identifier, the source identifier, and a reply message destination. The method includes selecting, by the dynamic generation server from a content management server, at least the updated HTML template, and the CSS string and graphics file associated with the updated HTML template based on the determination. The method continues with dynamically building, by the dynamic generation server, a customized HTML string using scraped input values from at least the request message and based on the selecting. Responsive to the dynamic building, the method further includes converting, by the dynamic generation server, the customized HTML string into a PDF document that conforms to at least one of the plurality of output requirement parameters. The method comprises returning, by the dynamic generation server, a reply message that includes the PDF document to the reply message destination based on the user identification value and source identifier.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
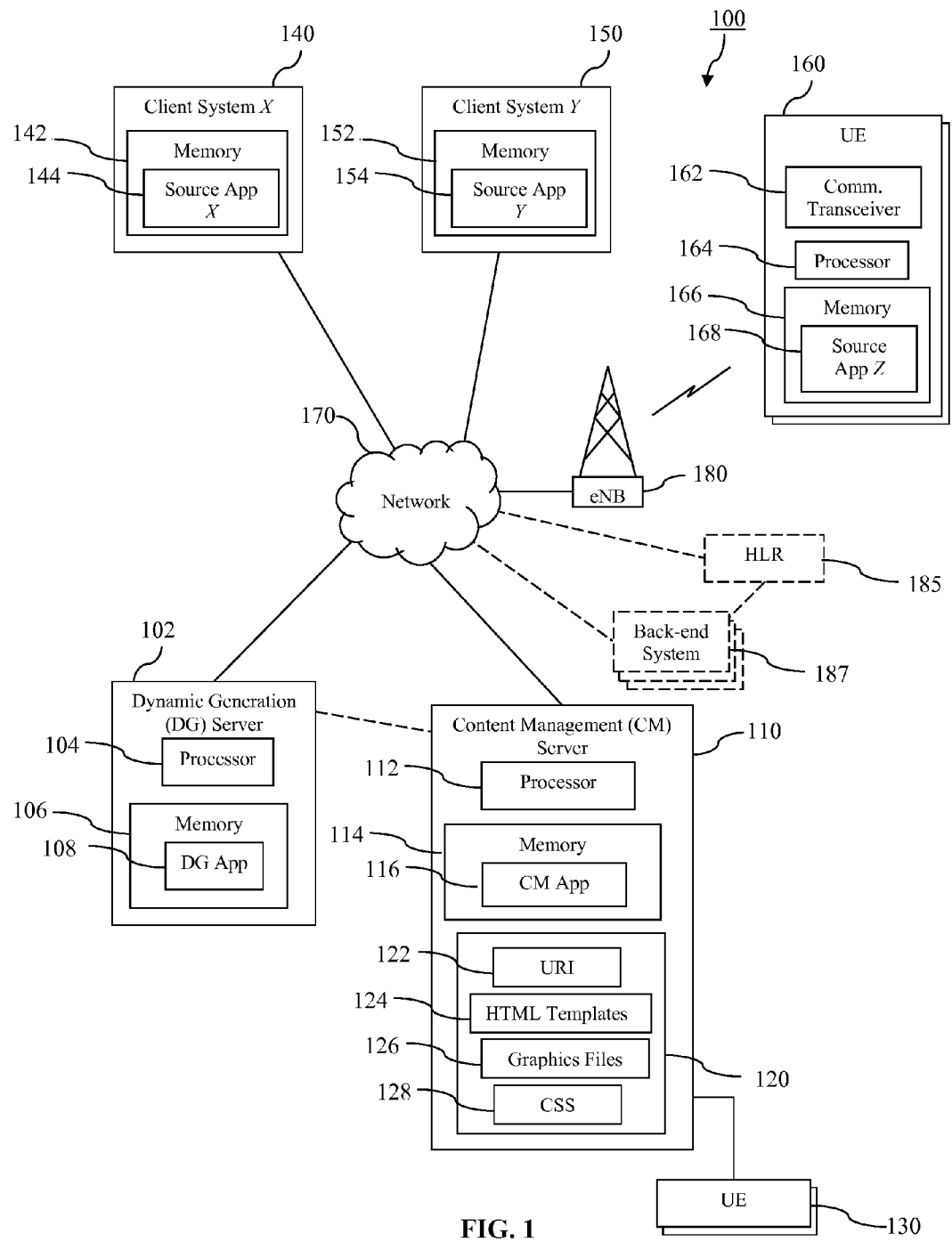
FIG. 1 illustrates an exemplary communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and method for providing digital communication using dynamic portable document format (PDF) generation. A service provider (operator) may provide telecommunication services to customers who may decide to change their subscription plan and/or obtain different features for their wireless service. Prior to implementing the changes to digital communication features for the customer's user equipment (UE), the service provider's telecommunications equipment, digital communication pathways, and parameters of a network may need to be analyzed and considered for regulatory and/or contractual reasons. Thus, customers may be asked to submit requests through specific documentation that conforms to certain regulatory and/or contractual requirements of the service provider. Because service providers may want to preserve the nature of certain aspects of the documentation (format, content, style, etc.) used in the customer's request, an operator may sometimes provide the customer with a portable document format (PDF) file for the customer to print out, fill-in, sign, and return to the operator before any changes are made. In some instances, an operator may provide a web form to capture certain customer input information, but the conversion of this input from the web form into a PDF file depends on static configuration by an information technology (IT) professional who predefines the static parameters in order for the desired conversion to ultimately occur.

Stated another way, some PDF documents are created locally on a computer that is receiving input information from the user and based on the layout initially presented to that user. For example, a user may access a web page (e.g., a web application accessed via a browser/portal) and the user may input information into form fields of the web page. Thus, when the user equipment submits the inputted information for output in a PDF document, a PDF converter is executed (e.g., locally or remotely) and is fed the input information, layout, and content as presented on the webpage. This type of PDF converter then converts the web page and user inputted content (as presented to the user on their UE) into a PDF document, where the outputted PDF document is at least substantially similar to how the webpage and input information appears as viewed and/or displayed on a display device showing the web page. Thus, any legal, regulatory, business or other types of information and content would have to be present and predefined and on the web page in order for it to appear in the outputted PDF document. This means that information not displayed on the web page will not appear in the outputted PDF document because the PDF converter is fed content as appears on the web page displayed to the user. In some embodiments, this type of alternate approach may be colloquially referred to as "save to PDF" and/or "print as PDF".

Alternatively, in another approach, the form fields of a web page (or other application accepting user input) may be linked to a predefined PDF document stored in a memory (either locally or remotely) and accessible to the web page/portal. Thus, upon submission of the form, the user may receive a PDF document on their computer that may not necessarily look like the web page (e.g., the format, content, language, etc. of the PDF may appear distinct from that of the web page into which they input their information), in reality the outputted PDF document is statically created without consideration of the user's input.

Yet these approaches cannot account for dynamic variations related to user input and operations of equipment, devices, and content of a service provider. Thus, the approaches mentioned above lead to, and further perpetuate, a technological problem in the field of computational generation of data structures within documents, while also propagating computational processing and economic inefficiencies; specifically because any changes or alterations desired (and/or required) to be in the PDF document would require an IT professional (and their associated equipment) to reprogram aspects of at least the web form, web application, and/or static PDF document in order to implement changes reflected in the outputted PDF document. Moreover, when the service provider has a partnership with a mobile virtual network operator (MVNO) (with the MVNO operating under a different brand from the service provider), customers subscribed to each of the different brands (i.e., each provider/operator providing the brands) may be asked to submit separate documentation for the same or similar types of requests related to the service. Thus, any changes in documentation (i.e., alterations to data structures in a coupled database) for each service may increase computer equipment downtime for servicing and coding (e.g., due to incompatibility); thereby requiring IT professionals to coordinate activities over multiple computing platforms and systems for individual alteration of the web forms to change to a different static configuration before conversion into a specific PDF document can occur.

Therefore, a dynamic generation framework implemented on a dynamic generation server provides a way to dynamically generate a PDF document that is specific and unique, while also being based on dynamically built information for conversion using user input and the particular application and/or client system making a request. This framework captures user input from form fields sent via the request message, identifies the type of application or individual associated with the request, and dynamically determines or modifies what information and variants of content are used for conversion to a PDF file. The dynamic generation framework may be deployed for particular web applications, or may be deployed for a utility service (e.g., web service) for user equipment and other computers to use via requests through an exposed application programming interface (API). A dynamic generation server can use this framework to decide among and select from a plurality of HTML sources, CSS strings, and other content (e.g., media, image graphics files, etc.), which may then be used by the framework to dynamically build a customized HTML string.

For example, brand X and brand Y may be associated with separate providers that serve separate customers, yet both brands may operate under a partnership, such as brand Y being an MVNO and brand X being a national telecommunication service provider. Both brand X and brand Y may use their own web applications for users to input information, such as for submitting a request to change features of the particular brand's communication service, but the partnership may allow for sharing of back-end resources, such as a dynamic generation server. Thus, the framework running on the dynamic generation server may handle requests for PDF documentation dynamically from users of both brand X and brand Y. The dynamic generation framework is able to take each request from the different brands and users, identify the quantity and type of users involved, determine the associated brand, and the type of request for documentation at issue for each brand. In some instances, the framework may then identify different HTML templates, graphics, formatting, and other content particular to each brand, and adapt the user input based on the identification to dynamically create and customize what is being converted for output in a particular PDF file.

Therefore, a customized HTML string (that is particular to the brand and identified variants) is dynamically created after the submission of a request, which can then be converted to a specific PDF file and sent back to the requesting brand or designated destination. In other words, the framework can take input from each request (i.e. one from brand X and one from brand Y), distinguish differences in required content from a content management server, and also verify output formatting parameters. This may then be used by the framework to dynamically build the complete set of information of what is being converted into PDF (e.g., a customized HTML string being converted), and then convert that complete set of information to a specific customized PDF document.

Thus, the same type of request (for example, request for adding a new user equipment (e.g., a new smart phone) to an existing communication service subscription for one particular brand) from different applications associated with distinct brands may result in the dynamic generation framework automatically adapting to the type of request, data input by a user, and modifications made to source content that is used in building customized HTML strings for each brand. The customized HTML string is then converted into a PDF document and sent to a destination determined by the framework. Accordingly, this framework allows for dynamically generating PDF documents in a particular format in a flexible manner that allows for incorporation of varied formatting and/or substantive changes of source content and input information. This is accomplished dynamically by the framework without the need to involve IT professionals to bring a system or application offline in order to statically rework the underlying code. Thus downtime for application maintenance is reduced (thereby increasing functional operating efficiency of the computer running the application) via the dynamic generation framework.

Turning now to FIG. 1, a system 100 is discussed that illustrates one or more embodiments of the present disclosure. In an embodiment, system 100 comprises a dynamic generation server 102, a content management (CM) server 110, a user equipment 130 associated with CM server 110, a client system X 140, a client system Y 150, a user equipment 160, an enhanced node B (eNB) 180, and a network 170. In some implementations, system 100 may include reference to a plurality of back-end computer systems 187 and a home location register 185. It is understood that system 100 may comprise any number of the components 102, 110, 130, 140, 150, 160, 170, 180, 185, and/or 187.

System 100 comprises a dynamic generation server 102 in communication with network 170. The dynamic generation server 102 may be associated with a particular operator (for example a telecommunication service provider of brand X). The dynamic generation server 102 may comprise at least one processor 104, a communicatively coupled non-transitory memory 106, and a dynamic generation application 108. The dynamic generation server 102 may, in an embodiment, be referred to as a dynamic generation framework, where the dynamic generation framework provides digital communication using dynamic portable document format (PDF) generation. The dynamic generation server 102 provides digital communication to a requesting client system (i.e., a specific computer device associated with a source application accessed by a browser and user, as described hereafter) by taking a request message—which may not conform to any of format, content, style, application programming language, file format, and/or other characteristic otherwise deemed necessary or suitable for a predetermined output in PDF—and translates, modifies, generates, and builds a customized HTML string to then dynamically generate a PDF document, which is then sent in a reply message. This may allow for a business (e.g., a telecommunication service provider) to provide customers with PDF documentation via dynamic generation without having to rely on IT personnel (i.e., computer specialists that must have specific knowledge of the unique software platforms and computer hardware needed to allow for implementation of any changes and/or modifications) whenever a particular source application (e.g., 144, 154, 168) is asked to provide a specific, unique PDF document.

In other words, the dynamic generation server 102 may generate a PDF document (e.g., in a specific format according to the particular and/or specific application) dynamically based on a variety of factors, including input from users, a particular source application (e.g., 144, 154, 168 and discussed in detail below), and/or a service provider's equipment receiving the PDF document generated from the framework. The dynamic generation framework and resulting PDF document may be used to provide digital communication for a customer's UE (e.g., a customer's smart phone, tablet, etc.) associated with a service provider. This means that a service provider may configure their telecommunication network (and/or how a device interacts with the network or equipment) based on the PDF document. The PDF document may be sent to equipment of the service provider (e.g., a back-end system 187 and/or home location register (HLR) 185 of a particular provider) which operates according to certain parameters and requirements in order to process PDF documents. Based on the PDF document conforming to certain parameters (e.g., formatting, content, file format being in notation acceptable integration with the equipment, authorization credentials present in the document, etc.) back-end system 187 may process the information of the PDF document and, in some embodiments, may initiate changing parameters of HLR 185 (or other systems) to provide digital communication services to the customer device (i.e., UE) according to the customer's request.

Although illustrated as a single server, the dynamic generation server 102 (and dynamic generation framework) are not so limited, and may (in some embodiments) be distributed across a plurality of servers (e.g., for example any of DG server 102, content management server 110, servers of back-end system 187) and/or data stores (not shown) that are communicatively coupled with the servers. The dynamic generation framework may be deployed, in some embodiments, within an application in a back-end environment and/or be deployed as a utility service (i.e., a web service) for other applications and third party computers to use (e.g., client applications like source application Z 168 using an exposed API of the dynamic generation framework). In some embodiments, the dynamic generation server 102 may implement a dynamic generation framework through any of modules, generation engines, parsers, and/or PDF converters. Although system 100 illustrates a single dynamic generation server 102 and dynamic generation application 108, it is understood that the dynamic generation framework may be implemented using one or more server computers (such as at least a portion implemented on dynamic generation server 102 and another portion on the content management server 110).

A dynamic generation server 102 may implement the dynamic generation framework via the dynamic generation application 108 and, upon execution by processor 104, configures processor 104 to receive a request message from a client system (e.g., a request message from client system X 140, which is discussed in detail below). The dynamic generation application 108 then parses the request message for information and relevant values in order to select the most relevant source content 120 (e.g., URI 122, HTML Templates 124, graphics files 126, CSS 128). For brevity, discussion of source content 120 and messages is provided below. Parsing relevant values from a request message may include the dynamic generation application 108 identifying a source identifier, request type identifier, input values of a plurality of fields (e.g., from inputs into a form of a source application 144, 154, 168), user identification value, and/or a reply message destination. Based on the parsed request message, the dynamic generation application 108 configures a processor to determine output requirement parameters for use in the building, creation, and output of at least one PDF document that is specific and customized to the request message(s).

The dynamic generation application 108 may further correlate the parsed information of the request message and/or output requirement parameters with particular source content 120 (e.g., any of at least one URI, HTML template, a Cascading Style Sheets (CSS) string, and a graphics file). Based on at least one determined correlation, the dynamic generation server 102 may select from among source content 120 that is accessible via a content management server 110. In some implementations, the dynamic generation server 102 may select one or more of the URI's 122, HTML templates 124, graphics files 126, and/or CSS strings 128. Input values and other information from the request message may be scraped based on the correlation and/or selection of particular source content 120.

It is understood that scraping may refer to the dynamic generation framework implementing a module(s) for evaluation, identification, extraction, and/or copying of (at least some) received information that is used in the creation of a customized HTML string, as discussed below. The dynamic generation server 102 may select particular source content 120 (e.g., from corresponding data store(s) 122, 124, 126, 128 comprising relevant information) based on references to a predefined set of rules, and/or may reference a particular identifier from the request message (e.g., request type identifier discussed below), read source content (e.g., the particular HTML template 124, graphics files 126, CSS 128) from the corresponding stored location, and then store the selected information as a string. Using the selections from source content 120 and scraped values, the dynamic generation server 102 may be configured to dynamically build a customized HTML string.

As further discussed below, it is understood that a customized HTML string may include any of values, media content (e.g., graphics files 126), at least one CSS string 128, and/or at least one HTML string from one of the HTML templates 124 managed by content management server 110. Note that If the dynamic generation server 102 determines that multiple, different PDF documents should be output responsive to information from the request message, the dynamic generation server 102 may dynamically build a plurality of different, distinct customized HTML strings, where each may be based on different combinations from among source content 120 (e.g., varied combinations from among any of 122, 124, 126, 128).

In some implementations, the dynamic generation server 102 dynamically builds customized HTML strings by configuring processor 104 to parse the HTML template selected for predefined fields (which may be identified by a dynamic placeholder that is predefined prior to selection), and map the scraped input values into predefined fields of an HTML template selected from among HTML templates 124 based on the correlation and selection. For example, the selected HTML template may have a place holder definition for placement of dynamic content in a specific manner. The dynamic content may be scraped input values that are mapped into the appropriate location. The dynamic server 102 may further, if necessary, modify—without user input— the scraped input values according to parameters of the predefined fields. That is, the dynamic generation server 102 may truncate character string length for input values being mapped into a certain field, or other modifications for implementing the input values or other information into a particular HTML template string.

The dynamic generation server 102 may also take selected source content (e.g., from among graphics files 126) and place the selected graphics file within the customized HTML string, such as by referencing a place holder definition of the selected HTML template for a particular graphics file. Additionally, the dynamic generation server 102 may apply the selected CSS string to the selected HTML template and implement the CSS string within the customized HTML string.

After a particular customized HTML string is dynamically built, the dynamic generation server 102 may be configured to use a PDF converter to convert the customized HTML string into a PDF document. Conversion into a PDF document may be dependent on the PDF document being output in a specific format which may be defined as one of the output requirement parameters. For example, a PDF document may conform to one of a Base16 notation format, Base32 notation format, Base64 notation format, or another predetermined format that may conform to requirements associated with a service provider (e.g., for being recognizable via the specific format by back-end system 187 in order to implement changes on systems like HLR 185 of the service provider). In some embodiments, the dynamic generation server 102 may utilize open source information, such as ITEXT library (and/or associated open source converter), in the process of conversion of the customized HTML string to a PDF document. Note that some types of PDF converters cannot be exposed as a web service due to their inability to interface with varied sources of information being fed into the converter.

In some implementations, the dynamic generation server 102 may take the dynamically generated PDF document and return it to a reply message destination (e.g., to a predestinated email address, back-end system 187 of a service provider, and/or particular source application 144, 154, 168). In an alternate embodiment, source content 120 (e.g., URI 122, HTML template 124, graphics files, 126, CSS strings 128) and/or customized HTML strings may be cached for use at a future time, and may be configurable to incorporate any changes made to source content 120 (e.g., an administrator using UE 130 to modify source content 120) since the time of caching. The dynamically generated PDF document may be returned in at least one reply message. The reply message may be based on the user identification value and source identifier, which are discussed below. Where multiple PDF documents are intended for different destinations, the dynamic generation server may send each PDF document to its corresponding destination in one or more reply messages.

Alternatively, the dynamic generation server 102 may send a reply message to the reply message destination with a link to the dynamically created PDF document that is stored remotely and accessible at a later time. Further, the dynamically generated PDF document may be signed and submitted to a back-end system 187 of a service provider. The back-end system 187 may configure a processor to analyze the signed PDF document and, based on recognizing that the dynamically generated PDF is signed (i.e., authorized by user to proceed with changes requested) and conforms to a specific format the dynamically created PDF document, implements changes to an associated Home Location Register (e.g., HLR 185) of the service provider such that the HLR authorizes access of multiple UE's (associated with the input values included in the dynamically generated PDF document) to wireless communication connection according to the requested change.

By way of example, and without limitation, the dynamic generation application 108 may parse a received request message and use the source identifier to determine that it is from source application X 144 and client system X 140 (for example, both being associated with brand X), and use the request type identifier and input values for indication that customer B (associated with telecommunication service brand X) wants to leave an existing family telecommunication service subscription (e.g., where customers A, B, C are linked to the family subscription) and open an individual telecommunication service subscription on brand X specific to customer B. Before customer B can access wireless services of brand X with the individual account, the service provider of brand X may need to obtain authorization from the primary holder of the family account (e.g., authorization from customer A) and also authorization from customer B who wants the individual account on brand X.

Thus, the dynamic generation application 108 may determine that activation of a new subscription service (for customer B) and modification to the family subscription (now just for customers A and C) should correspond with output parameters that yield different PDF documents (e.g., type, content, formatting, etc.) for the individual subscription (for customer B) and the family subscription (for customers A and C). The dynamic generation application 108 may then correlate the information and scraped values associated with customer B with a first set of source content that comprises a particular URI, HTML Template, graphics file, and/or CSS string. This first set is selected, and the dynamic generation application 108 dynamically builds a first customized HTML string specific for customer B. This first customized HTML string may then be converted to a customized PDF document that is unique to customer B and the variants associated with the request for individual subscription.

Continuing with the example, similarly the dynamic generation application 108 may also correlate the information and scraped values associated with customers A and C (for the family subscription) with a second set of source content—where the second set of source content may be different and distinct from that of the first subset used for customer A. The second set of source content may use a different HTML template, different graphics files, and/or different CSS strings for layout. Note that the source application X and/or request message pertaining to the customers A, B, and C does not have to set forth all of the parameters for a PDF document's layout, content, or how it should be generated. The dynamic generation framework can dynamically account for variants of information in the request message and source content in order to adapt for dynamically building and outputting a custom PDF document for each customer and/or situation. Each customized HTML string built from the corresponding set of source content and values may then be converted into PDF documents (e.g., one PDF document for customer B, and a different PDF document for customers A and C). These documents may be sent to each of the corresponding customers for authorization and signature. After a back-end system of brand X confirms that each corresponding custom PDF document is signed and conforms to a particular format, the back-end system may trigger changes and modifications to parameters of an HLR (e.g., HLR 185) of brand X, which in turn, may allow customer A to access wireless communication service of brand X via a UE through an individual subscription account.

Turning back to system 100, the client system X 140 and client system Y 150 may be implemented as specialized computer systems, which are described in more detail hereinafter. Client system X 140 and client system Y 150 may each comprise a processor (not shown) and non-transitory memory 142, 152 that stores source application X 144 and source application Y 154, respectively. Source application X 144 may be implemented as a web application that configures a processor of client system X 140 to receive input of users (e.g., customers associated with a particular telecommunication service provider) through a graphical user interface (GUI) in a browser. The GUI may be accessed via a portal for coupling with network 170, where the portal may be an enterprise portal showing web-based GUI's displayed through a web browser. Similarly, source application Y 154 may also be implemented as a web application in a similar manner to that of source application X 144, and thus the characteristics described herein of a web application may be included in source application Y 154.

A particular client system (e.g., client system X 140 and/or client system Y 150) and/or a web application (e.g. source application X 144 and/or source application Y 154) may be considered as a distinct source of information and, as such, may comprise (or be associated with) specific source identifiers for identification and recognition by other devices during network communications, such as when communicating with dynamic generation server 102 via network 170. It is understood that source application X 144 may be independent of source application Y 154. For example, source application X 144 may be a web application associated with a telecommunications service provider operating under brand X, whereas source application Y 154 may be a different (albeit possibly similar in nature) web application associated with an MVNO that provides services under brand Y. Accordingly, source application X 144 may configure a GUI for display to a user that presents media and display content in a manner that is distinct from that of source application Y 144. A source application (e.g., any of 144, 154, 168) may include an HTML web form, which may be an HTML 5 webpage with JavaScript Application programming interfaces (APIs).

A source application (e.g., source application X 144 and/or source application Y 154) may be configured to receive input values (e.g., input by a user on a UE and/or other computer accessing the web application through a browser) in form fields that are predefined. In some implementations, the form fields may be implemented as a HyperText Markup Language (HTML) element and/or via one or more buttons that selects an associated asynchronous JAVASCRIPT (AJAX) request. The particular web application (e.g. source application X 144 and/or source application Y 154) may configure a GUI using, for example, a specific and distinct HTML string and/or Cascading Style Sheets (CSS) that are particular to the web application. It is understood that the HTML of a web application may include variants of the language (e.g., HTML, XHTML, HTML5, etc.).

Input values may be occasionally referred to as dynamic content, given that the values being input will vary based on the user, form field, and/or selection button. Each web application may receive input values corresponding to input from users (or associated with multiple users) of each web application, and each web application may be configured to communicate via network 170 through the use of messaging, such as a request message. For example, a GUI configured by a web application (e.g., source application X 144 and/or source application Y 154) may provide one or more form fields that accept input values and send those values through a request message (e.g., a message using Hypertext Transfer Protocol (HTTP), AJAX messaging, JavaScript Object Notation (JSON) message, or the like) to the dynamic generation server 102 for processing.

In some embodiments, the dynamic generation server 102 may de-capsulate and/or transcode values that may have been encapsulated in the request message. When the user submits the request via the particular source application (144, 154, 168), the request message may be sent to a particular back-end of a service provider, such as to dynamic generation server 102. A source application (e.g., any of 144, 154, 168) may be identified as a requesting source application by the dynamic generation server 102 in order to distinguish where and/or how a particular request message originated and how the request should be treated.

A request message may comprise any of a source identifier, a request type identifier, a reply message destination, and a user identification value. A source identifier may include a value string that is based on any of a port identifier of the particular client system (e.g., client system X 150), client system name, client system identifier (i.e., identifier of the system running the particular source application 144, 154, 168), HTTP message tag (e.g., value assigned to the particular request message associated content transmitted therewith), uniform resource identifier (URI) (e.g., the particular source application resource link, such as www.brandX.com or www.brandY.com or other link specific to the web application), and an identifier of the source application (e.g., 144, 154, 168). The source identifier may enable dynamic generation framework (e.g., dynamic generation application 108 on dynamic generation server 102) to determine where the particular request is coming from (e.g., the particular source application, client system, UE, or etc.) and respond accordingly.

A request type identifier may be associated with the particular request message type that is being requested by the user. The request type identifier may correspond and/or be correlated with a particular HTML template (e.g., at least one of the HTML templates 124 which are discussed later) and/or HTML template type. The request type identifier may be a value and/or string that is a general indicator of what the submitted request message is requesting. For example, a request type identifier may correspond with a user request to change service accounts, a user upgrading to a new UE, a user requesting one of the UE's of a subscription is moved to a separate subscription, requesting a new mobile phone number, or adding a new UE to an account subscription.

The type of request may correspond with particular documentation that needs to be signed and/or verified by a user prior to the service provider enabling the particular request. In some embodiments, the request type identifier may be a predefined indicator that the dynamic generation server 102 uses to pick which particular HTML template(s) (or other source content 120 discussed below) should be referenced in the process of creating PDF documents by the dynamic generation server 102, as disclosed below. It is understood that a request message may comprise multiple request type identifiers. It is also understood that a request message (such as through the use of a predefined indicator) does not need to specifically identify the location of corresponding content (e.g., source content 120 discussed below) pertinent to the request.

In some implementations, at least some input values and/or associated form fields may correspond (be associated) with a dynamic place holder of source content 120, where the dynamic place holder defines where input values are placed among the particular source content. Input values may be data input into fields (e.g., form fields) of the particular web application via a GUI. For example, a user may input their name into a form field, where the characters of the name are the input values. When the request message is submitted, the input values (here the user's name) is correlated with a dynamic placeholder in an HTML template (e.g., 124) and the input values (here the user's name) may be placed in the corresponding arrangement when a customized HTML string is created. Further discussion of customized HTML strings is disclosed below.

Note that, in some embodiments, input values associated with the identification of a particular user(s) (e.g., a particular customer of the UE and/or subscription) may be referred to as user identification values, and such values may be associated with a specific tag of a form field in the source application. A user identification value may be the name of a particular user and/or may indicate the particular type of user, such as a customer of the service provider, an employee, a contractor, technician, potential customer, guest, or other known status types operating with the service provider. Thus, in some embodiments, a request message may identify a predefined plurality of user identification values that each correspond with a different user. The dynamic generation framework (e.g., dynamic generation server 102) may use the user identification values of a request message to figure out, for example, how many users are associated with the request, whether each user requires the same treatment for dynamic generation, whether customized HTML strings should be built for each user or just for a subset of those identified, and/or other indications for deciding which variants of content should be referenced in creation of individual PDF documents.

A request message may also comprise a reply message destination that may include an indicator of where the dynamic generation framework should reply. For example, the reply message destination may be an email address, Internet Protocol (IP) address, source application address for receiving content, HTTP reply pathway or other communication link paths via network 170. In some embodiments, it may be determined (e.g., by indication in the request message and/or upon determination by the dynamic generation framework) that multiple reply messages will be submitted to different reply message destinations, such as where multiple users are involved in the request message, and dynamically generated material should be sent to distinct destinations (e.g., for users, source applications, etc.).

In some embodiments, responsive to a request message and dynamically generating one or more PDF documents, one reply message (with at least some dynamically generated PDF's) may be sent back to a particular source application (via a first reply message destination) and another reply message with the same and/or different dynamically generated PDF's is sent to a back-end system (e.g. 187) associated with the dynamic generation server 102. The back-end system 187 may, in some embodiments, be triggered by the received PDF (from the dynamic generation server 102 that dynamically generates the PDF responsive to a request message) and implement changes to a telecommunications network (e.g., changing digital communication access in an HLR 185 for a new customer based on parsing and mapping information from the PDF associated with the new customer).

The implementation of the dynamic generation framework disclosed herein may improve the functional operations of a communications network by increasing communication efficiency among devices (e.g., between computers coupled with back-end systems 187) associated with a service provider and network, such as through decreasing downtime of particular client systems and/or source applications by mitigating the need for IT professionals to shut down parts of the communication network in order to implement content changes. Thus, this may also improve operational and functional efficiency of a device (e.g., a particular user's UE or other computer system) accessing a source application (144, 154, 168) through decreasing the functional complexity of the source application (e.g., 144, 154, 168) and thus decreasing processing requirements (and increasing processing availability) of a processor on any of a client system (e.g., 140, 150) and/or UE 160. This may also improve the technological field of implementing digital communication access (by a service provider to customers) of a telecommunication network through increased availability of source applications.

In some implementations, one web application (e.g., source application X 144) may be associated with another web application (e.g., source application Y 154), where source application Y 154 uses at least some elements of source application X 144. For example, source application X 144 may provide particular Java Archive (JAR) packages for source application Y 154 to use, thus extending availability of and/or referencing name-value pairs (NVP) and/or key-value pairs (KVP) for inclusion in a particular request message sent to dynamic generation server 102.

It is understood that the system 100 may comprise any number of UE's (e.g., 130, 160) and any number of access points (e.g., an enhanced/evolved Node B (eNB) 180, a base transceiver station "BTS", and so on without limitation to a particular wireless protocol). These access points (e.g., eNB 180) can be terrestrial access points (or ground stations), or satellite access points. The UE 160 may comprise a radio communication transceiver 162, at least one processor 164, and a non-transitory memory 166. Further discussion of a UE is provided with respect to FIG. 4-FIG. 6. The UE 160 is configured to use the radio communication transceiver 162 to establish a wireless communication link with eNB 180. The eNB 180 may at least partly provide communications connectivity of the UE 160 and to a network 170. A client system X 140, client system Y 150, back-end system 187, or any number of other UE's, client systems, or servers (e.g., 102, 110), may also have access to the network 170.

The collectivity of eNB 180 and other access nodes (not illustrated) may be said to comprise a radio access network (RAN), in that these eNBs 180 may facilitate a radio communication link to the UE 160 to provide communicative access to the network 170 (including but not limited to a core network, internet, and/or intranet). The network 170 may comprise any combination of private and public networks. In an embodiment, the dynamic generation server 102, content management server 110, and/or source content 120 may be located in the same wired or wireless local area network (LAN), and/or may be coupled remotely via network 170. The radio access network may be abstracted in different ways and may comprise, in addition to the eNBs 180, servers and data stores such as home location registers (HLRs) (e.g., HLR 185) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and communicative connectivity to the UE's (e.g., 160).

The radio communication transceiver 162 may communicate (via communicative coupling) with the eNB 180 using any of a variety of wireless communication protocols including, for example without limitation, a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol that may be used in a wireless communications network or a data communications network. As discussed in the foregoing, voice transmission and/or data can be transmitted to the UEs from the RAN (e.g., an eNB) using a variety of networks and configurations. Accordingly, the illustrations provided herein are not intended to limit the embodiments of the invention and are merely to aid in the description of aspects of embodiments of the invention.

The UE 160 may include but not be limited to a mobile phone, a personal digital assistant (PDA), a media player, a wireless enabled computer, a wearable computer, a wearable communication device, or other mobile communication device. Further discussed of a UE is disclosed in FIG. 4. In an embodiment, the UE 160 may have other components (not shown) such as a near field communication (NFC) radio transceiver, a wireless local area network (WLAN) radio transceiver, or other components for communicative coupling.

In an embodiment, UE 160 may comprise a source application Z 168 that is stored in the non-transitory memory 166. In some implementations, source application Z 168 may be a type of source application that is a client application of a third party, and thus utilizes the dynamic generation framework (e.g., via dynamic generation server 102) as a web service via the use of exposed API calls via network 170 to dynamic generation server 102. The dynamic generation server 102 may reply to the client application (e.g., source application Z 168) via the exposed API's and reply destination that is addressed to the UE 160. Use of the dynamic generation framework as a web service (e.g., via source application Z 168) may be implemented substantially similar to that of a web application. That is, a user of the UE 160 may input values into form fields of source application Z 168, which are then sent in a request message using exposed API's to dynamic generation framework (e.g., dynamic generation server 102) via eNB 180 and network 170.

Using the dynamic generation framework of the dynamic generation server 102 as a web service may be implemented by the source application Z 168 and UE 160 interacting through a service layer to bridge the dynamic generation framework with the particular client application making the request (e.g., source application Z 168 that may be any third party who is not the operator of the dynamic generation framework). In some embodiments, user input values (and other information of source application Z 168) may be sent in a request message using Session Initiation Protocol (SIP) messaging, where the dynamic generation server 102 may receive the SIP message (as the request message from source application Z 168) and use (and/or transform, modify) the information and values (e.g., request type identifier, source identifier, user identification values, and/or other payload parameters encapsulated in the SIP message) prior to dynamically building a customized HTML string, as discussed hereinafter.

Alternatively, the UE 160 may also be able to access a web application (e.g., source application X 144 or source application Y 154) via a browser and GUI of the UE 160 and thus utilize the dynamic generation server 102 via the web application. In some embodiments, use of the dynamic generation framework via a web application (e.g., source application X 144 or source application Y 154) may interact and/or interface with the dynamic generation framework via an application layer (e.g., where the web application is native to the communication service provider and not a client application (non-native application) that is a third party application).

The system 100 may further comprise a content management server 110. The content management server 110 may include a processor 112, memory 114, and a communication transceiver (not shown). The memory 114 may store a content management application 116 that configures the content management server 110 to manage, decide, and facilitate a dynamic generation framework's access to source content 120. In some implementations, the content management server 110 manages source content 120 through execution of the content management application 116. The content management application 116 may identify source content based on a corresponding content identifier of the particular source content 120. That is, each type of source content (e.g., 122, 124, 126, 128) may be uniquely identified based on what the content represents. The particular content identifier may be provided to dynamic generation server 102 responsive to a request for the associated source content 120.

A user may input changes into a GUI displayed on UE 130 that may be associated with a business or CM server 110, and the input may correspond with a change in the particular source content 120. The content management server 110 and content management application 116 may provide the GUI to the UE 130 and update the source content 120 and/or corresponding content identifier based on the modification and/or change to the particular source content 120 indicated from the UE 130. If there are any location path changes or other changes associated with the source content, the content management server 110 may automatically account for these variations and accordingly provide access to source content 120 for the dynamic generation server 102. The content management server 110 may further provide source content 120 to the dynamic generation server 102 based on a selection of the particular source content 120 desired by a dynamic generation server 102.

Source content 120 may include particular data structures defined at least in part by UE 130 and may be stored in non-transitory memory 114, and/or in a communicatively coupled data store separately located from memory 114. The content which a dynamic generation framework (e.g., dynamic generation server 102) references may be referred to as source content 120, and a particular subset of the source content 120 may be used for incorporation into a customized HTML string. Source content 120 may include Uniform Resource Identifier (URI) content 122, a plurality of Hypertext Markup Language HTML templates 124, a plurality of graphics files 126, a plurality of Cascading Style Sheets (CSS) strings 128, and/or other content. However, it is understood that source content 120 is not limited to 122, 124, 126, 128, and may include content added via UE 130 and/or retrieved from a remote data store via network 170.

Although illustrated as one content management server 110, it is understood that, in some embodiments, managing source content may include a plurality of servers and/or data stores to form a content management system for storage and management of source content 120. The source content 120 (e.g., any of 122, 124, 126, 128) may include but not be limited to unique data structures, objects, strings that are configurable for storage in a variety of memory locations (e.g., in memory 114) or in separate storages. The content management application 116 may be executed and configure processor 112 to manage the location paths for accessing source content 120, while also providing source content 120 requested by the dynamic generation server 102.

The content management server 110 may be linked to at least one UE 130 (i.e., a computer system that is associated with the management, modification, updating, and/or alteration of at least some source content 120 via received input), where the UE 130 may receive input from business organization members, clients, and/or from users to modify, alter, and/or change parameters of the source content 120. Modifications or changes to source content 120 may be implemented via UE 130 by users, where the content management application 116 allows the UE 130 to access, manipulate, and modify, at least one of the source content 120 (e.g. changing the content of HTML templates 124, graphics files 126, and/or CSS strings 128 to alter the look, feel, and/or layout of the outputted PDF document) without needing to involve IT professionals to perform any changes to the parser and/or PDF converter of the dynamic generation server 102 and dynamic generation application 108. It is understood that embodiments of system 100 may be implemented to perform the methods disclosed herein, such as method 200 of FIG. 2 and/or method 300 of FIG. 3.

Figure 2:
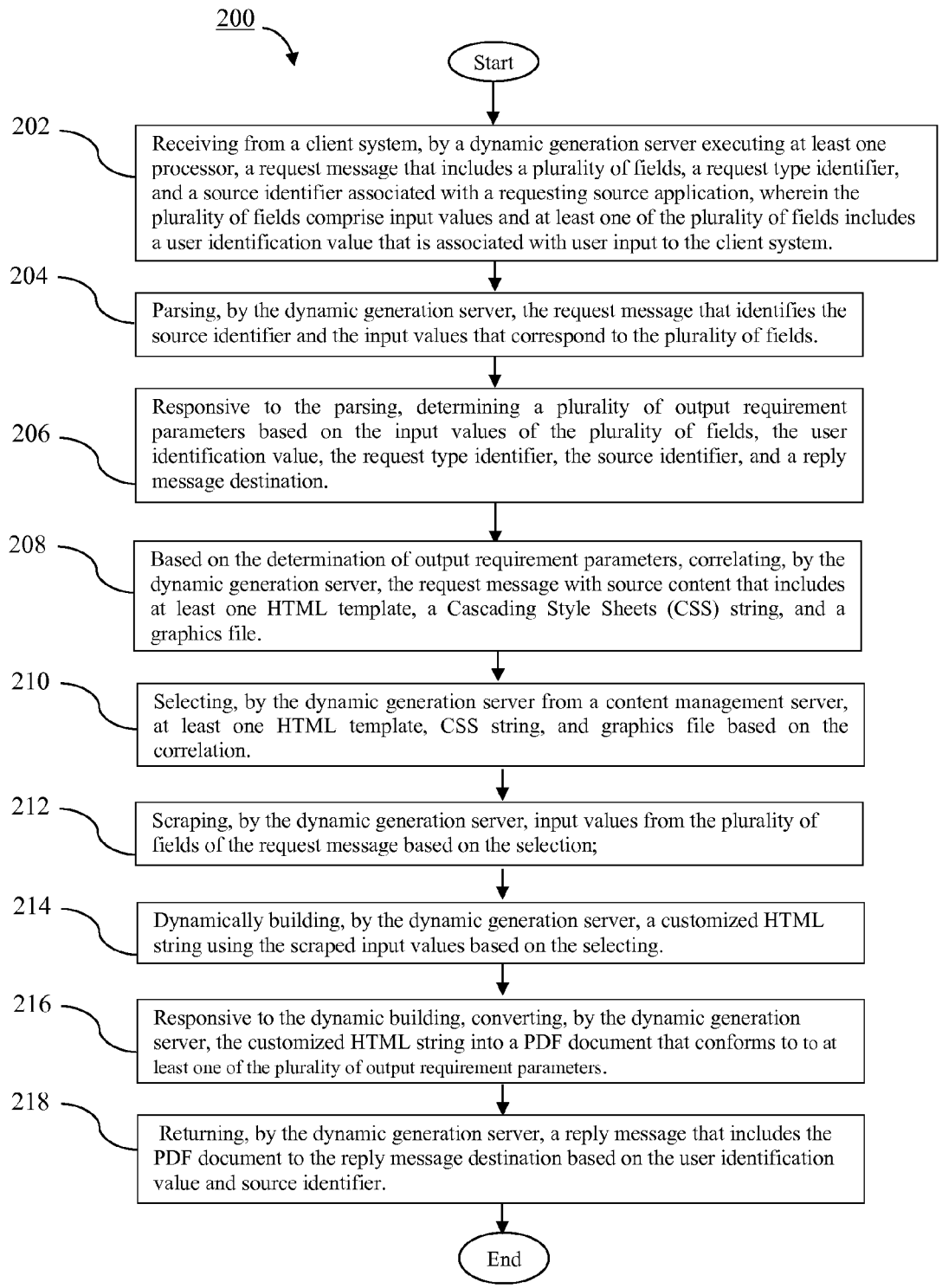
FIG. 2 illustrates an exemplary method according to an embodiment of the disclosure.

Turning now to FIG. 2, a method 200 for providing digital communication using dynamic portable document format (PDF) generation is disclosed. At block 202 the dynamic generation server 102 implementing a dynamic generation framework may execute at least processor 104 and receive a request message from a client system (e.g., 140, 150). The request message may include a plurality of fields, a request type identifier, and a source identifier associated with a requesting source application. The plurality of fields may comprise input values and one of the fields may include a user identification value that is associated with user input to a client system. For example, the user identification value may be a user's name. In some implementations, the source application sending the request may be a web application (e.g., 144, 154) accessed by the client system executing at least one processor and/or a client application (e.g., 168) that sends the request message via API calls to the dynamic generation server 102 as a web service.

At block 204 the method 200 further includes the dynamic generation server 102 parsing the request message that identifies the source identifier and the input values that correspond to the plurality of fields. At block 206 the dynamic generation server 102 determines a plurality of output requirement parameters based on any of the input values of the plurality of fields, the user identification value, the request type identifier, the source identifier, and a reply message destination. In some implementations, the output requirement parameters define at least a PDF output format (e.g., Base64 notation format), a quantity of customized Hypertext Markup Language (HTML) strings (e.g., corresponding to the number of different PDF documents that are to be outputted), and the reply message destination. The source identifier may be based on any of a port identifier of the client system, client system name, client system identifier, internet protocol (IP), HTTP message tag, and uniform resource identifier (URI). The request type identifier may correspond with a HTML template type referenced by the dynamic generation server 102 and used for determining which HTML template (and/or other particular source content 120) is selected from location storage of the source content 120.

At block 208, the method 200 continues by the dynamic generation server 102 correlating, based on the determination of output requirement parameters, the request message with source content 120 that includes at least one HTML template (e.g., from 124), a Cascading Style Sheets (CSS) string (e.g., from 128), and a graphics file (e.g., from 126). A correlation by the dynamic generation server 102 may be based on any of the plurality of fields, the request type identifier, and the source identifier. At block 210 the dynamic generation server 102 uses the correlation to select (e.g., through the use of content management server 110) particular source content 120 (e.g., any of particular HTML templates, CSS strings, and/or graphics files from their respective storage locations). For example, a request message related to switching a communication service on brand X may correspond with selecting a subset of source content 120 that includes an HTML template for opening a new account, a corresponding CSS string, and a plurality of graphics files associated with brand X and the selected HTML template.

At block 212, the method 200 may further include the dynamic generation server 102 scraping input values from the plurality of fields of the request message based on the selection. At block 214 the dynamic generation server dynamically builds at least one customized HTML string using the scraped input values based on the selecting. The method 200 continues at block 216 with the dynamic generation server converting, responsive to the dynamic building, the customized HTML string into a PDF document. The PDF document may conform to a PDF output format (e.g., Base 64 notation format discussed in FIG. 1.) that is an output requirement parameter. In some embodiments, dynamic building of a customized HTML string by the dynamic generation server may comprise mapping the scraped input values of the request message into predefined fields of the selected HTML template. The mapping may be based on determination of a correlation and the particular selection of source content 120 (e.g., which particular HTML template 124 being selected). Dynamic building by the dynamic generation server 102 may further include modifying the scraped input values according to parameters of the predefined fields, placing the selected graphics file within the customized HTML string, and applying the selected CSS string to the selected HTML template.

In some embodiments, the method 200 may include the dynamic generation server 102 determining whether the request message identifies a predefined plurality of user identification values that each correspond with a different user. Such as whether the request message is associated with three users and whether a different outputted PDF document is required for each user (and thus different source content such as HTML templates, graphic files, CSS strings, and/or URI's is required to dynamically build a customized HTML string being fed for conversion into a converter of the dynamic generation server 102. Responsive to a determination that the request message corresponds with a plurality of users (e.g., identification of a plurality of user identification values and different HTML templates for each of the plurality of user identification values), the dynamic generation server 102 may implement steps to adapt to outputting multiple PDF documents. This may include the dynamic generation server 102 dynamically building a plurality of customized HTML strings, where each customized HTML string corresponds to particular user information (e.g., corresponding to any of a user identification value, HTML template, CSS string, and graphics file).

Building each of the plurality of customized HTML strings may be based on the dynamic generation server 102 using the scraped input values of the request message and/or different source content, which may be selected via the use of content management server 110. In an embodiment, the plurality of customized HTML strings may comprise a first customized HTML string and a second customized HTML string. The second customized HTML string may be based on a different set of source content 120 (e.g., a different HTML template) from that of the first customized HTML string. Responsive to dynamically building each customized HTML string, the dynamic generation server 102 may convert at least the second customized HTML string into a second PDF document (based on the second customized HTML string) that conforms to the PDF output format. This second PDF document may be returned by the dynamic generation server to a particular reply message destination (which may be based on the corresponding user identification value and source identifier, and which may be different than where the first PDF document is being sent.

At block 218 the method 200 includes the dynamic generation server 102 returning a reply message—which may include the PDF document—to the reply message destination, and may be based on the user identification value and source identifier. In some implementations, a PDF document that is converted from a customized HTML string may conform to a particular format (e.g., a base64 notation output file format, or other notation format that is predefined as being compatible with a back-end system of a service provider associated with the PDF document).

Figure 3:
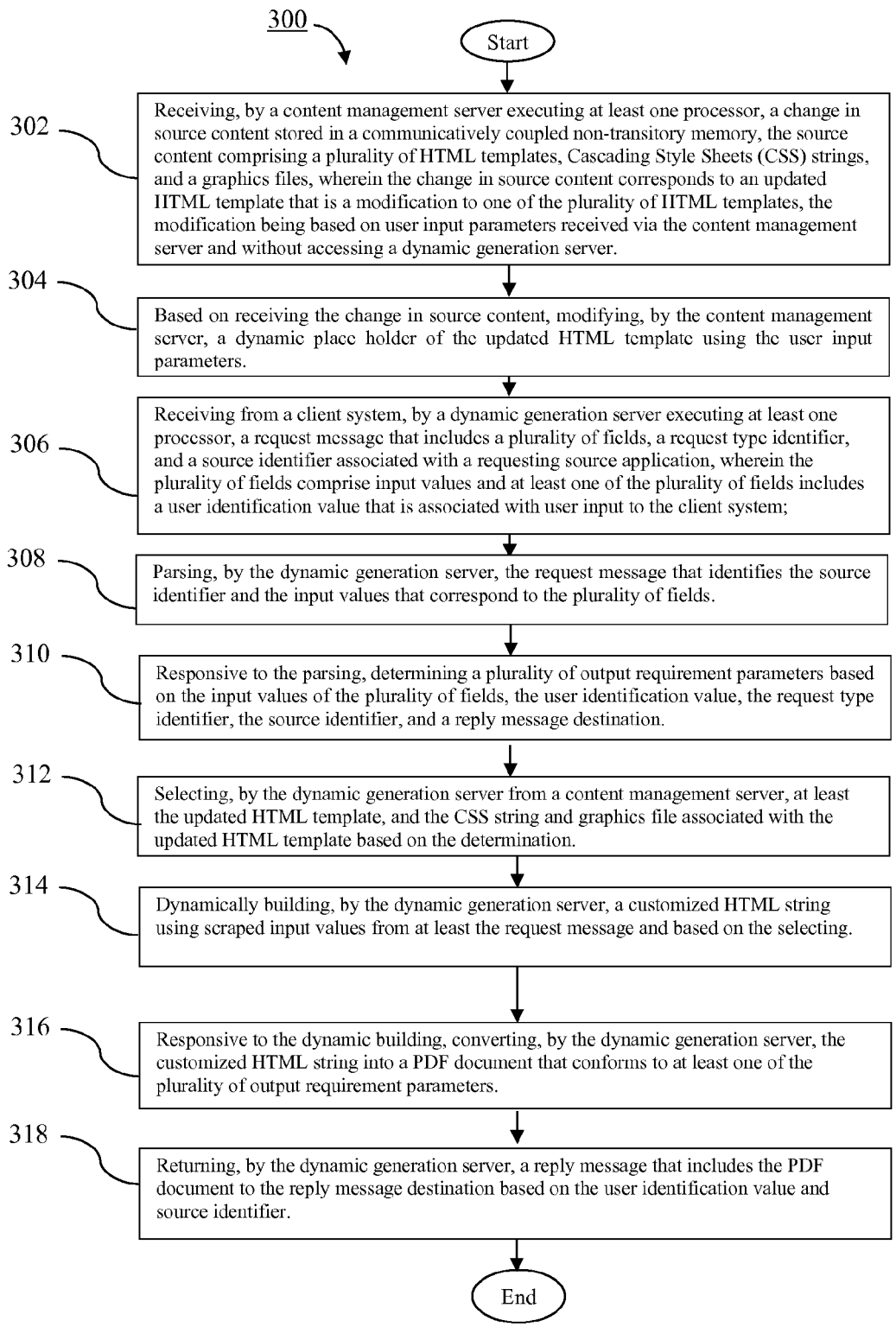
FIG. 3 illustrates an exemplary method according to an embodiment of the disclosure.

Turning now to FIG. 3, a method 300 for providing digital communication using dynamic portable document format (PDF) generation is disclosed. The method 300 begins at block 302 where the content management server 110 receives a change in source content 120. The source content 120 may be stored in a communicatively coupled non-transitory memory. In some embodiments, the source content 120 may be stored in at least one communicatively coupled data store that may be located remotely from the content management server 110. The source content 120 may include a plurality of HTML templates, Cascading Style Sheets (CSS) strings, and/or a graphics files. The change in source content may correspond with updated and/or modified source content 120 (e.g., an updated HTML template that is a modification to one of the plurality of HTML templates 124). Modification of source content 120 may be based on user input parameters received via the content management server 110 (and/or via a UE 130). In some implementations, modifications, alterations, and/or updates to particular source content 120 may occur without accessing a dynamic generation server 102 and/or altering the dynamic generation application 108 implementing dynamic generation framework.

At block 304 based on receiving the change in source content 120, the dynamic content management server 110 may modify the dynamic place holder (and/or reference to the dynamic place holder) of the updated source content (e.g., updated HTML template) by using the user input parameters. For example, a user device (e.g., UE 130) may indicate that a change should be made to one of the HTML templates such as adding a new form field or modifying an existing form field. These input parameters indicating the change may be used to modify the dynamic place holder, and thus the new and/or modified dynamic place holder may correspond with different and/or alternate input values scraped from a request message received by the dynamic generation server 102. In some implementations, the method 300 may include the dynamic generation server identifying, from the content management server, at least one of the source content 120 (e.g., any of the corresponding CSS string, graphics file, and/or URI) based on receiving the change in source content. Because of the identification of corresponding source content 120, the dynamic generation server 102 and/or content management server 110 may associate one segment of updated source content 120 with the identified corresponding source content 120 that may or may not have been updated. For example, the association may be between the updated HTML template and the at least one corresponding CSS string and graphics file of the source content 120.

Turning to block 306, the method 300 further comprises a dynamic generation server 102 executing at least one processor receiving, from any of a client system (e.g., any of 140, 150) and UE (e.g., 160), a request message corresponding with a requesting source application (i.e., the source application making the request). The request message may comprise a plurality of fields, a request type identifier, and a source identifier associated with a requesting source application (e.g., 144, 154, 168). The plurality of fields may comprise input values, and at least one of the plurality of fields may include a user identification value. The user identification value may be associated with user input to the corresponding client system (e.g., 140, 150) and/or UE (e.g., 160) of the request message.

The requesting source application may include any of a web application accessed by the client system (e.g., any of 140, 150) executing at least one processor. Alternatively, a requesting source application may include a third party application (e.g., 168) that sends the request message via API calls to the dynamic generation server 102 as a web service. It is understood that, at least in some implementations, the source identifier may be based on any of a port identifier of the client system, client system name, client system identifier, internet protocol (IP), HTTP message tag, uniform resource identifier (URI), or other identification of the particular device that participates in initiating the request message. The request type identifier may correspond with a HTML template type referenced by the dynamic generation server. For example, a request type identifier for adding a new subscription to a wireless service may correspond with the particular HTML template that is used for adding a customer subscription, along with the legal, regulatory, and/or other predefined information required to be in the outputted PDF document.

At block 308 the method 300 further includes the dynamic generation server 102 parsing the request message, where the parsing identifies the source identifier and the input values that correspond to the plurality of fields. At block 310, responsive to the parsing, the dynamic generation server 102 then determines a plurality of output requirement parameters, which may be based on any of the input values of the plurality of fields, the user identification value, the request type identifier, the source identifier, and a reply message destination. Output requirement parameters may define any of a PDF output format, a quantity of customized Hypertext Markup Language (HTML) strings, and the reply message destination. The PDF document may conform to a specific format (e.g., Base64 notation output file format). In some implementations, the dynamic generation server 102 may also correlate the request message with at least the updated source content 120 (e.g., updated HTML template or other modified, altered, and/or updated source content 120). The correlation may be based on any of the determination of output requirement parameters, the plurality of fields, the request type identifier, and the source identifier.

The method 300 continues at block 312, with the dynamic generation server 102 selecting, from the content management server 110 (where the content management server 110 controls access to source content 120), at least the updated HTML template, and a CSS string and graphics file associated with the updated HTML template based on the determination. Based on the selection, the method may also (in some implementations) include scraping, by the dynamic generation server, input values from the plurality of fields of the request message. At block 314 the dynamic generation server dynamically builds a customized HTML string using scraped input values from the request message and based on the selection. The selection of source content 102 may be stored as a string by the dynamic generation server 102. Dynamically building the customized HTML string by the dynamic generation server may include mapping the scraped input values of the request message into predefined fields of the selected HTML template based on the correlation and the selection of the HTML template. The dynamic building may also comprise modifying the scraped input values according to parameters of the predefined fields, placing the selected graphics file within the customized HTML string, and applying the selected CSS string to the selected HTML template that is the updated HTML template.

The method 300 continues at block 316, where responsive to the dynamic building of the customized HTML string, the dynamic generation server 102 converts the customized HTML string into a PDF document that conforms to a PDF output format, where the PDF output format is an output requirement parameter. At block 318, the method continues by the dynamic generation server 102 returning a reply message to the reply message destination. For example, this may include sending to a source application (e.g., 144, 154, 168), web portal, API, client system, and/or user equipment via network 170. The reply message may comprise any of the PDF document and a link to the PDF document stored remotely. The reply message may be based on the user identification value and source identifier.

Figure 4:
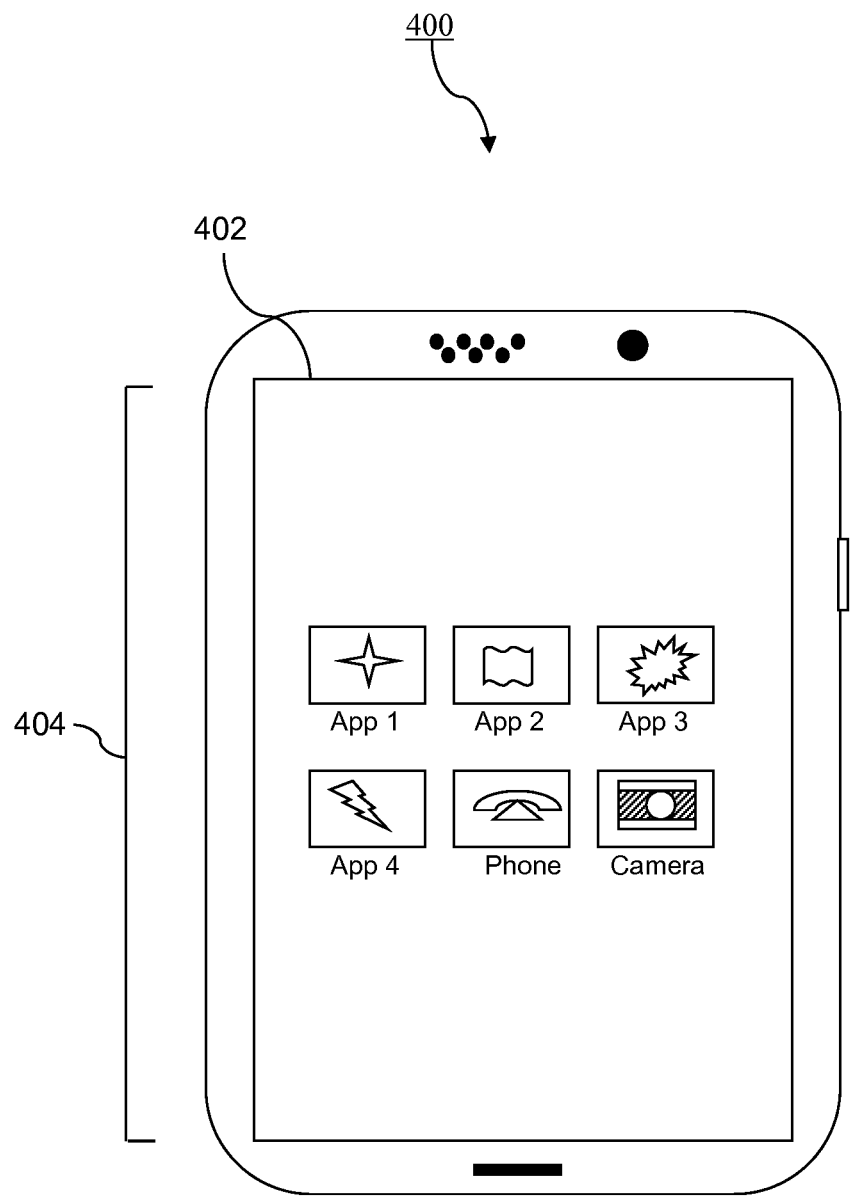
FIG. 4 is an illustration of user equipment according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 can be embodied by any of a number of types of devices including but not limited to a wireless handset, cellular telephone, a tablet, a pager, a personal digital assistant (PDA), a laptop computer, a desktop computer, a "smart" phone, PC, a gaming device, a media player, PC cards, compact flash devices, external or internal modems, wireless or wireline phone, and so on. A user equipment (e.g., 400) may be mobile or stationary, and may communicate with a network (e.g., a radio access network (RAN), core network, intranet, internet, etc.). As used herein, the term "UE" may be referred to interchangeably as an "access terminal" or "AT", a "wireless device", a "mobile phone", a "mobile communication device", a "portable electronic device", a "client device", a "subscriber device", a "subscriber terminal", a "subscriber station", a "user terminal" or UT, a "mobile terminal", a "mobile station" and variations thereof.

The UE 400 includes a touchscreen display 402 having a touch-sensitive surface for input by a user. Although a predefined number of application icons 404 are illustrated within the touch screen display 402, it is understood that in different embodiments, any number of application icons 404 may be presented via the touch screen display 402. In some embodiments of the UE 400, a user may be able to receive, download, and/or install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry and/or gesture entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page (or other communication portal). The web page may be obtained via wireless communications with a base transceiver station (e.g., associated with any wireless communication technologies such as CDMS, LTE, etc.), a wireless network access node, Node B (NB), enhanced Node B, (eNB), a peer UE 400 or any other wireless communication network or system. For example, in some embodiments, UE 400 may include at least one of the systems and/or devices discussed above in FIG. 1 including but not limited to 130, 140, 150, and/or 160.

Figure 5:
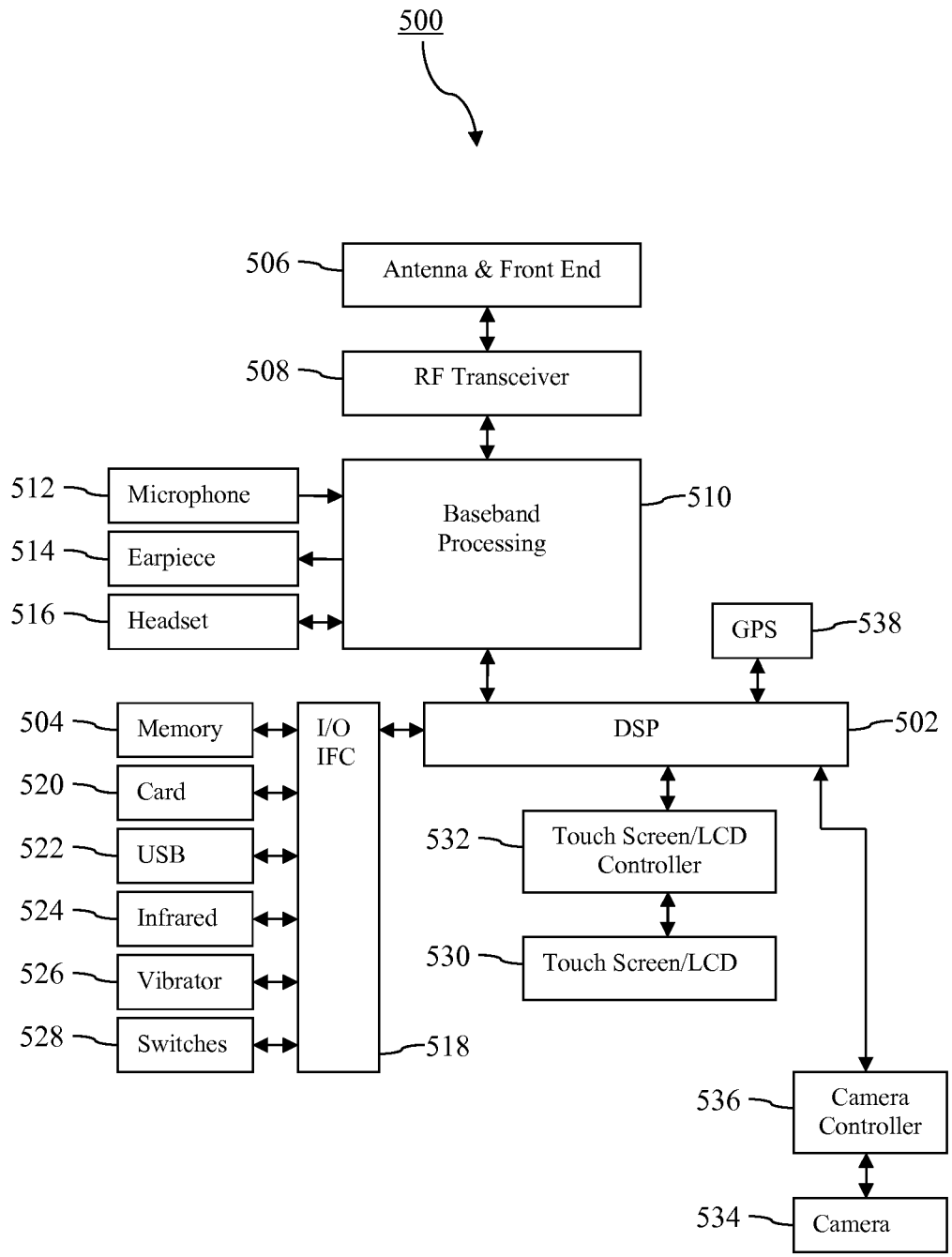
FIG. 5 is a block diagram of user equipment according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508 (e.g., communication transceiver 162, or other air interface device), a baseband processing unit 510, a microphone 512 (i.e., an input receiving port), an earpiece speaker 514, a headset port 516 (i.e., output signaling port), an input/output interface 518, a removable card 520 (e.g., removable memory, UICC, etc.), a universal serial bus (USB) port 522, an infrared port 524, a vibrator 526 (i.e., an electro-mechanical actuation mechanism), electro-mechanical switches 528, a touch screen liquid crystal display (LCD) with a touch sensitive surface 530 (i.e., sensitive to input touch and/or non-contact gestures), a touch screen/LCD controller 532, a camera 534, a camera controller 536, and a global positioning system (GPS) receiver 538. In an embodiment, the UE 400 may include another kind of display that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby nodes, wireless air interfaces, other UE's, and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be communicatively coupled to a motherboard of the device 400 and/or to components of the device 400 via a different path (e.g., not via the input/output interface 518), for example coupled to a power control circuit (power button) of the device 400. The touch screen display 530 is another input mechanism, which further displays text and/or graphics to the user. The touch screen display is not limited to liquid crystal, but may include other display mechanisms such as LED, OLED, wearable display, and the like. It is understood that touch screen display 530 may not necessarily be limited to receiving input via touch, but may also include gesture recognition via coupling to other components (e.g., 534, 536, etc.). The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
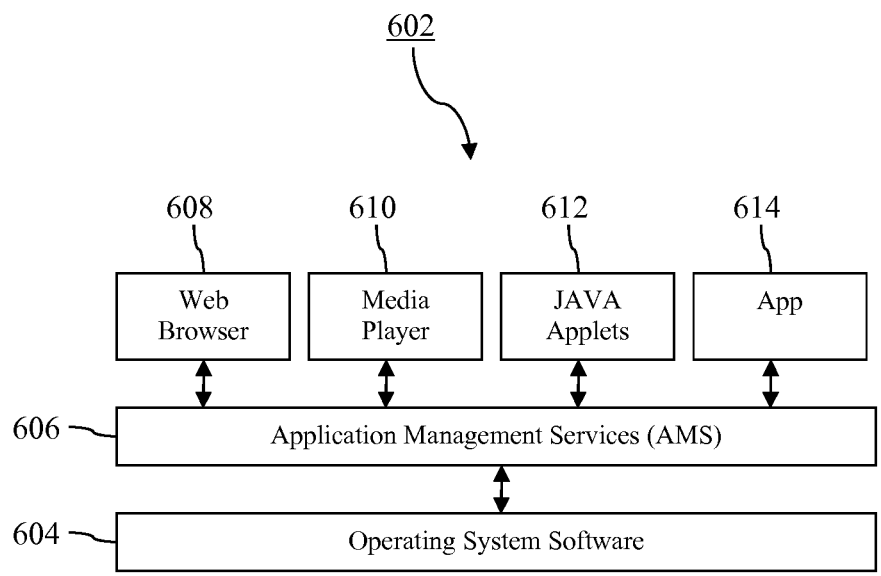
FIGS. 6A and 6B are block diagrams of a software architecture for a computer system and/or user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality for applications such as games, utilities, and other functionality. The AMS 606 may also couple and interact with other applications 614, such as applications discussed in FIG. 1 (e.g., 144, 154, 168, 108, and/or 116).

Figure 6B:
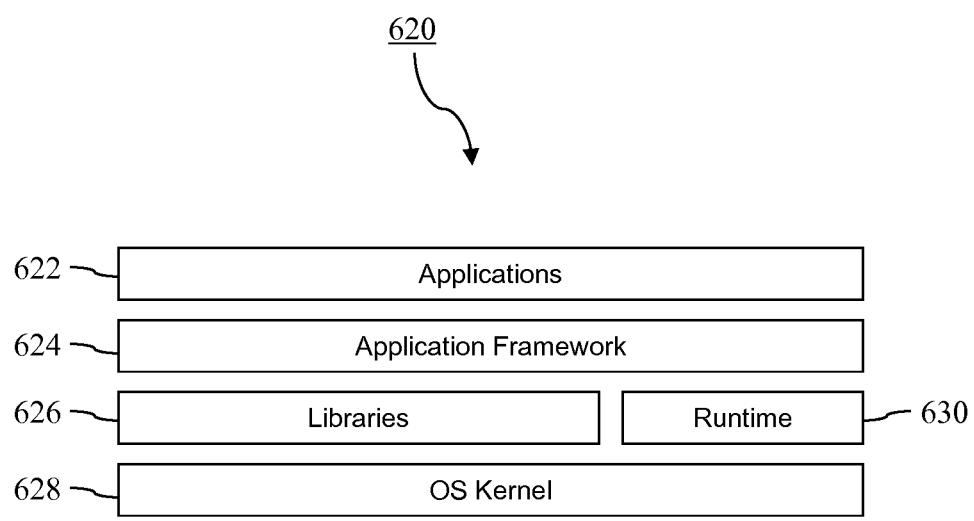

FIG. 6B illustrates an alternative software environment 620 that may be implemented by the DSP 502 (or other processor). The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
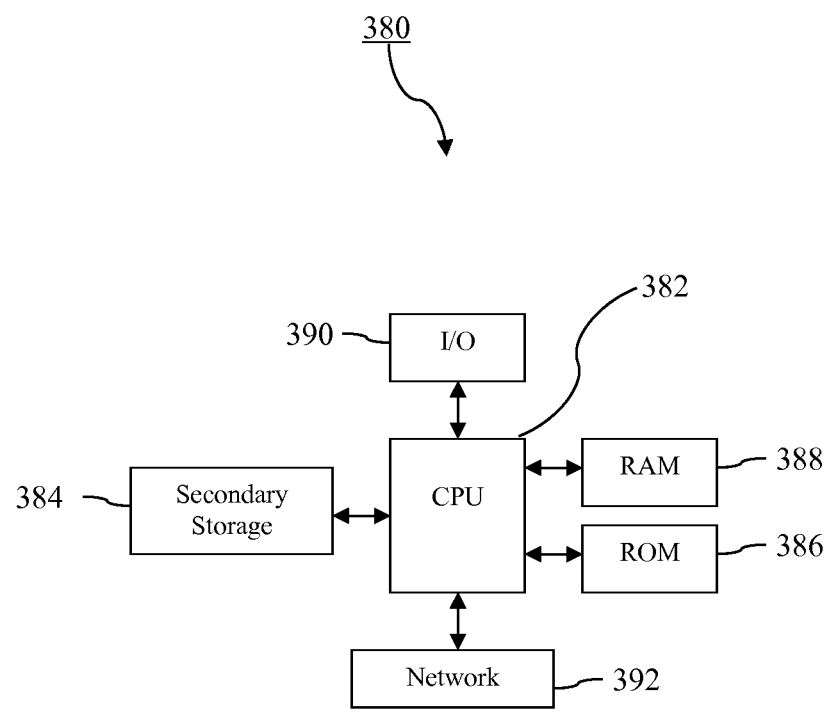
FIG. 7 illustrates an exemplary computer system suitable for implementing at least some aspects of the several embodiments of the disclosure.

Some portions of the system 100 described above may be implemented by a computer system(s) (e.g., 102, 110, 130, 140, 150, 160, etc.) with sufficient processing power, memory resources, and network throughput capability to handle the necessary workload placed upon it. A server and/or computing systems can be implemented as a plurality of structurally separate servers, or alternately may correspond to a single server. FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384 (which may include non-transitory memory), read only memory (ROM) 386, random access memory (RAM) 388, input/output (I/O) devices 390, and network connectivity devices 392. The processor 382 may be implemented as one or more CPU chips. A computer system 380 may communicate with a network, such as with a core network via a RAN, and through the core network the computer system can be connected with external networks such as the Internet. Of course, other mechanisms of connecting to a network (e.g., the core network, RAN, LAN, and/or the Internet) are also possible for the computer system 380, such as over wired access networks, WiFi networks (e.g., based on IEEE 802.11, etc.) and so on. Computer system 380 can be embodied by any of a number of types of devices discussed herein.

It is understood that by programming and/or loading executable instructions onto the computer system 380, at least one of the CPU 382, the RAM 388, and the ROM 386 are changed, transforming the computer system 380 in part into a particular machine or apparatus (specialized computer) having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices including but not limited to the components discussed in FIG. 5.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing digital communication using dynamic portable document format (PDF) generation, comprising:
receiving from a client system, by a dynamic generation server comprising at least one processor, a request message that includes a plurality of fields, a request type identifier, and a source identifier associated with a requesting source application, wherein the plurality of fields comprise input values and at least one of the plurality of fields includes a user identification value that is associated with user input to the client system;
parsing, by the dynamic generation server, the request message that identifies the source identifier and the input values that correspond to the plurality of fields;
responsive to the parsing, determining a plurality of output requirement parameters based on the input values of the plurality of fields, the user identification value, the request type identifier, the source identifier, and a reply message destination;
based on the determination of output requirement parameters, correlating, by the dynamic generation server, the request message with source content that includes at least one HTML template, a Cascading Style Sheets (CSS) string, and a graphics file;
selecting, by the dynamic generation server from a content management server, at least one HTML template, CSS string, and graphics file based on the correlation;
scraping, by the dynamic generation server, input values from the plurality of fields of the request message based on the selection;
dynamically building, by the dynamic generation server, a customized HTML string using the scraped input values based on the selecting by:
mapping the scraped input values of the request message into predefined fields of the selected HTML template based on the correlation and the selection of the HTML template,
modifying the scraped input values according to parameters of the predefined fields,
placing the selected graphics file within the customized HTML string, and
applying the selected CSS string to the selected HTML template;
responsive to the dynamic building, converting, by the dynamic generation server, the customized HTML string into a PDF document that conforms to at least one of the plurality of output requirement parameters; and
returning, by the dynamic generation server, a reply message that includes the PDF document to the reply message destination based on the user identification value and source identifier.

2. The method of claim 1, wherein the plurality of output requirement parameter includes any of a PDF output format, a quantity of customized Hypertext Markup Language (HTML) strings, and the reply message destination.

3. The method of claim 1, wherein the requesting source application is any of a web application accessed by the client system executing at least one processor, and a client application that sends the request message via application programming interface (API) calls to the dynamic generation server as a web service.

4. The method of claim 1, wherein the PDF document conforms to a base64 notation output file format, and wherein a telecommunications network is configured for a user equipment based on the PDF document.

5. The method of claim 1,
wherein the source identifier is based on any of a port identifier of the client system, client system name, client system identifier, internet protocol (IP), HTTP message tag, and uniform resource identifier (URI),
wherein the request type identifier corresponds with a HTML template type referenced by the dynamic generation server, and
wherein the correlating is based on the plurality of fields, the request type identifier, and the source identifier.

6. The method of claim 1, further comprising:
determining whether the request message identifies a predefined plurality of user identification values that each correspond with a different user, and whether a different HTML template is required for each user;
responsive to a determination that the request message identifies a plurality of user identification values and different HTML templates for each of the plurality of user identification values:
dynamically building, by the dynamic generation server, a plurality of customized HTML strings with each corresponding to a particular user identification value, HTML template, CSS string, and graphics file,
wherein building each the plurality of customized HTML strings is based on using the scraped input values of the request message, and
wherein the plurality of customized HTML strings comprise the customized HTML string and a second customized HTML string, the second customized HTML string being based on a different HTML template from the customized HTML string;
responsive to each dynamic build, converting, by the dynamic generation server, at least the second customized HTML string into a second PDF document that conforms to the PDF output format; and
returning, by the dynamic generation server, the second PDF document to the reply message destination based on the corresponding user identification value and source identifier.

7. A system for providing digital communication using dynamic portable document format (PDF) generation, comprising:
a content management server that comprises:
at least one processor,
a non-transitory memory communicatively coupled with the at least one processor, the non-transitory memory stores source content, the source content comprising a plurality of Hypertext Markup Language (HTML) templates, a plurality of Cascading Style Sheets (CSS) strings, a plurality of graphics files, and
a content management application that, upon execution configures the at least one processor to,
identify source content based on a corresponding content identifier of the particular source content, wherein the corresponding content identifier is provided to a dynamic generation server responsive to a request associated with source content, update the source content and corresponding content identifier responsive to a change in the particular source content referenced by the content management server, and provide source content responsive to a selection by a dynamic generation server; and the dynamic generation server that comprises:

at least one processor, a non-transitory memory communicatively coupled with the at least one processor, and a dynamic generation application that, upon execution configures the at least one processor to, receive, from a client system, a request message that includes a plurality of fields, a request type identifier, and a source identifier associated with a requesting source application, wherein the plurality of fields comprise input values and at least one of the plurality of fields includes a user identification value that is associated with user input to the client system, parse the request message that identifies the source identifier and the input values that correspond to the plurality of fields, responsive to the request message being parsed, determine a plurality of output requirement parameters based on the input values of the plurality of fields, the user identification value, the request type identifier, the source identifier, and a reply message destination, based on the determination of output requirement parameters, correlate, by an identification of source content from the content management server, the request message with source content, wherein the correlation references at least one HTML template, a Cascading Style Sheets (CSS) string, and a graphics file, based on the correlation, select, from a content management server, at least one HTML template, CSS string, and graphics file, scrape input values from the plurality of fields of the request message based on the selection, dynamically build a customized HTML string using the scraped input values based on the selection by:

mapping the scraped input values of the request message into predefined fields of the selected HTML template based on the correlation and the selection of the HTML template, modifying the scraped input values according to parameters of the predefined fields, placing the selected graphics file within the customized HTML string, and applying the selected CSS string to the selected HTML template, responsive to the dynamic build, convert the customized HTML string into a PDF document that conforms to at least one of the plurality of output requirement parameters, and return a reply message that includes the PDF document to the reply message destination based on the user identification value and source identifier.

8. The system of claim 7, wherein the plurality of output requirement parameter include any of a PDF output format, a quantity of customized Hypertext Markup Language (HTML) strings, and the reply message destination.

9. The system of claim 7, wherein the requesting source application is any of:

a web application accessed by the client system that is a computer that executes at least one processor, the client system accessing the web application via a portal to the dynamic generation server, and a client application that sends the request message via application programming interface (API) calls to the dynamic generation server as a web service, the client application being stored on a non-transitory memory executable to configure at least one processor of a user equipment.

10. The system of claim 7, wherein the PDF document conforms to a base64 notation output file format, and wherein a telecommunications network is configured for a user equipment based on the PDF document.

11. The system of claim 7, wherein the source identifier is based on any of a port identifier of the client system, client system name, client system identifier, internet protocol (IP), HTTP message tag, and uniform resource identifier (URI), and wherein the request type identifier corresponds with a HTML template type referenced by the dynamic generation server.

12. The system of claim 7, wherein the correlating is based on the plurality of fields, the request type identifier, and the source identifier.

13. A method for providing digital communication using dynamic portable document format (PDF) generation, comprising:

receiving, by a content management server comprising at least one processor, a change in source content stored in a communicatively coupled non-transitory memory, the source content comprising a plurality of HTML templates, Cascading Style Sheets (CSS) strings, and graphics files, wherein the change in source content corresponds to an updated HTML template that is a modification to one of the plurality of HTML templates, the modification being based on user input parameters received via the content management server and without accessing a dynamic generation server;

based on receiving the change in source content, modifying, by the content management server, a dynamic place holder of the updated HTML template using the user input parameters;

receiving from a client system, by the dynamic generation server comprising at least one processor, a request message that includes a plurality of fields, a request type identifier, and a source identifier associated with a requesting source application, wherein the plurality of fields comprise input values and at least one of the plurality of fields includes a user identification value that is associated with user input to the client system;

parsing, by the dynamic generation server, the request message that identifies the source identifier and the input values that correspond to the plurality of fields;

responsive to the parsing, determining a plurality of output requirement parameters based on the input values of the plurality of fields, the user identification value, the request type identifier, the source identifier, and a reply message destination;

selecting, by the dynamic generation server from a content management server, at least the updated HTML template, and the CSS string and graphics file associated with the updated HTML template based on the determination;

dynamically building, by the dynamic generation server, a customized HTML string using scraped input values from at least the request message and based on the selecting by:
- mapping the scraped input values of the request message into predefined fields of the selected HTML template based on the correlation and the selection of the HTML template,
- modifying the scraped input values according to parameters of the predefined fields,
- placing the selected graphics file within the customized HTML string, and
- applying the selected CSS string to the selected HTML template that is the updated HTML template;

responsive to the dynamic building, converting, by the dynamic generation server, the customized HTML string into a PDF document that conforms to at least one of the output requirement parameters; and returning, by the dynamic generation server, a reply message that includes the PDF document to the reply message destination based on the user identification value and source identifier.

14. The method of claim 13, further comprising:
identifying, by the dynamic generation server from the content management server, at least one corresponding CSS string and graphics file based on receiving the change in source content;
associating, by the dynamic generation server from the content management server, the updated HTML template with the at least one corresponding CSS string and graphics file of the source content;
based on the determination of output requirement parameters, correlating, by the dynamic generation server, the request message with at least the updated HTML template, wherein the selecting by the dynamic generation server is based on the correlation, wherein the correlating is based on the plurality of fields, the request type identifier, and the source identifier; and
scraping, by the dynamic generation server, input values from the plurality of fields of the request message based on the selection.

15. The method of claim 13, wherein the plurality of output requirement parameters include any of a PDF output format, a quantity of customized Hypertext Markup Language (HTML) strings, and the reply message destination, wherein the PDF document conforms to a base64 notation output file format, and wherein a telecommunications network is configured for a user equipment based on the PDF document.

16. The method of claim 13, wherein the requesting source application is any of a web application accessed by the client system executing at least one processor and a client application that sends the request message via application programming interface (API) calls to the dynamic generation server as a web service.

17. The method of claim 13,
wherein the source identifier is based on any of a port identifier of the client system, client system name, client system identifier, internet protocol (IP), HTTP message tag, and uniform resource identifier (URI), and
wherein the request type identifier corresponds with a HTML template type referenced by the dynamic generation server.

* * * * *